United States Patent
Miyagawa et al.

(10) Patent No.: US 7,241,036 B2
(45) Date of Patent: Jul. 10, 2007

(54) TAIL LIGHT STRUCTURE

(75) Inventors: Toru Miyagawa, Wako (JP); Koichi Hikichi, Wako (JP); Koichi Shimamura, Wako (JP)

(73) Assignee: Honda Motor Co., Ltd., Minato-ku (JP)

( * ) Notice: Subject to any disclaimer, the term of this patent is extended or adjusted under 35 U.S.C. 154(b) by 45 days.

(21) Appl. No.: 10/854,617

(22) Filed: May 26, 2004

(65) Prior Publication Data

US 2005/0013138 A1 Jan. 20, 2005

(30) Foreign Application Priority Data

Jun. 24, 2003 (JP) .............................. 2003-179856

(51) Int. Cl.
- *B62J 6/00* (2006.01)
- *F21V 33/00* (2006.01)
- *F21V 7/00* (2006.01)
- *F21V 21/00* (2006.01)
- *F21S 8/10* (2006.01)

(52) U.S. Cl. ...................... 362/473; 362/506; 362/517; 362/518; 362/545

(58) Field of Classification Search ................ 362/473, 362/545, 517, 518
See application file for complete search history.

(56) References Cited

U.S. PATENT DOCUMENTS

| | | | |
|---|---|---|---|
| 3,808,424 A * | 4/1974 | Rijnders | 362/308 |
| 4,729,075 A * | 3/1988 | Brass | 362/217 |
| 4,733,335 A * | 3/1988 | Serizawa et al. | 362/503 |
| 4,799,131 A * | 1/1989 | Aho et al. | 362/518 |
| 5,709,453 A * | 1/1998 | Krent et al. | 362/496 |
| 6,224,246 B1 * | 5/2001 | Natsume et al. | 362/518 |
| 6,224,624 B1 | 5/2001 | Lasheras et al. | |
| 6,249,375 B1 * | 6/2001 | Silhengst et al. | 359/362 |
| 6,280,480 B1 * | 8/2001 | Tuttle et al. | 362/518 |
| 6,341,885 B1 * | 1/2002 | Futami et al. | 362/518 |
| 6,422,726 B1 * | 7/2002 | Tatsukawa et al. | 362/517 |
| 6,469,622 B1 * | 10/2002 | Komatsu et al. | 340/464 |
| 6,499,870 B1 * | 12/2002 | Zwick et al. | 362/505 |
| 6,520,668 B1 * | 2/2003 | Reiss | 362/516 |
| 6,957,903 B2 * | 10/2005 | Arakawa et al. | 362/545 |
| 2002/0149312 A1 * | 10/2002 | Roberts et al. | 313/495 |
| 2005/0146887 A1 * | 7/2005 | Calderas | 362/509 |

FOREIGN PATENT DOCUMENTS

JP 6-24371 2/1994

OTHER PUBLICATIONS

Examination Document dated Jul. 7, 2006.

* cited by examiner

*Primary Examiner*—John Anthony Ward
*Assistant Examiner*—David Makiya
(74) *Attorney, Agent, or Firm*—Hamre, Schumann, Mueller & Larson, P.C.

(57) ABSTRACT

A tail light structure having a light-emitting body and a reflector member for reflecting light from the light-emitting body for external illumination. The reflector member has a lower reflecting surface for receiving maximum external light and an upper reflecting surface and left and right reflecting surfaces, and the lower reflecting surface having a lower reflectance than the upper reflecting surface and the left and right reflecting surfaces.

7 Claims, 12 Drawing Sheets

FIG. 11
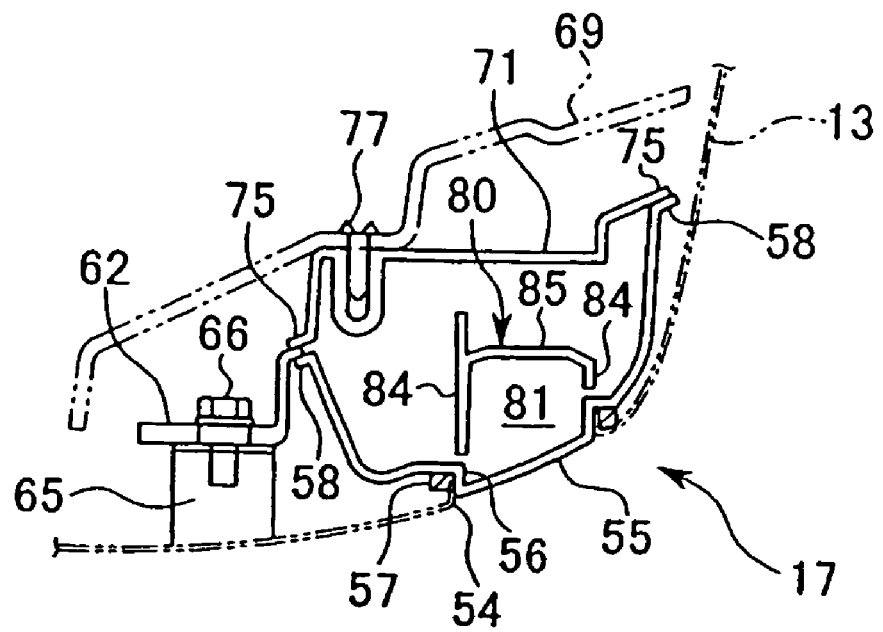
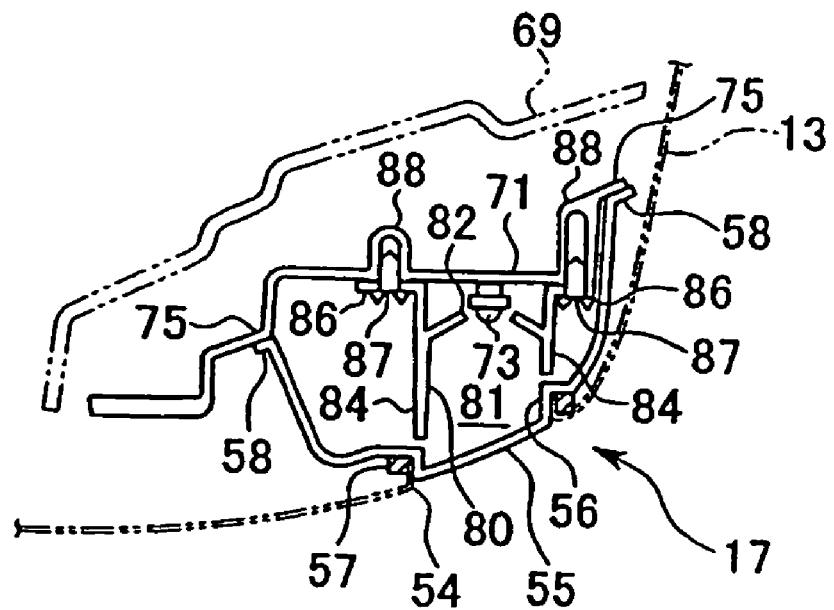
FIG. 12

TAIL LIGHT STRUCTURE

FIELD OF THE INVENTION

The present invention relates to a tail light structure for motorcycles or the like.

BACKGROUND OF THE INVENTION

Some motorcycles or the like, for example, employ light-emitting diodes as tail lights. Such a tail light has a reflecting plate disposed around the light-emitting diode for reflecting light from the light-emitting diode for keeping visibility. For example, the tail light structure disclosed in Japanese patent laid-open No. Hei 6-24371.

The conventional tail light structure described above is advantageous in that its power consumption is small because it employs the light-emitting diode. However, if sunlight is applied to the tail light structure and is reflected by the reflecting plate in daytime, then the reflected sunlight is possibly mixed with the reflected light of the light-emitting diode. In view of this drawback, the tail light structure may be so shaped that it is disposed in a location where sunlight is less likely to be applied. However, such a solution poses the problem of reduced design freedom.

Consequently, the present invention provides a tail light structure which achieves better visibility and higher design freedom.

SUMMARY OF THE INVENTION

To solve the above problems, there is provided a tail light structure having a light-emitting body and a reflecting plate for reflecting light from the light-emitting body for external illumination, characterized in that the reflecting plate has a first reflecting portion for receiving maximum external light and a second reflecting portion other than the first reflecting portion, the first reflecting portion having a lower reflectance than the second reflecting portion.

With the above arrangement, the reflection of external light at the first reflecting portion which receives maximum external light is suppressed, so that light from the light-emitting body is sufficiently reflected by the second reflecting portion, thus eliminating the effect of external light on the reflected light from the light-emitting body. Visibility of the light-emitting body can be increased. Since the reflecting portion needs to be improved only, limitations on the shaping of the vehicle body are not posed, the appearance of the vehicle body is not adversely affected, and the freedom of design is increased.

The tail light structure may further be characterized in that the first reflecting portion has a coating for preventing external incident light from being reflected. With this arrangement, since only the portion which receives much external light may have a coating applied, the tail light structure can be manufactured simply by coating certain regions of general-purpose products, resulting in a reduction in the cost.

The tail light structure may also be characterized in that the first reflecting portion has a structure for reducing external incident light from being reflected. Rather, the reflecting surface is only required to be formed without the need for any special subsequent processing, so that the tail light structure can be manufactured at a reduced cost. External incident light may be scattered by the first reflecting portion having a convex or prism cut reflecting surface. With this arrangement, it is not necessary to use any special members for preventing external incident light from being reflected.

The light emitting body of the tail light structure may comprise a light-emitting diode. With this arrangement, the tail light structure can suppress heating and can be of a low profile. Therefore, the tail light structure can be designed with increased freedom, e.g., can be shaped and placed with increased freedom, for improved appearance.

BRIEF DESCRIPTION OF THE DRAWINGS

FIG. 11 is a cross-sectional view taken along line 11—11 of FIG. 7;

FIG. 12 is a cross-sectional view taken along line 12—12 of FIG. 7;

DETAILED DESCRIPTION OF THE INVENTION

Embodiments of the present invention will be described below with reference to the drawings. FIGS. 1 through 15 show a first embodiment of the present invention.

Figure 1:
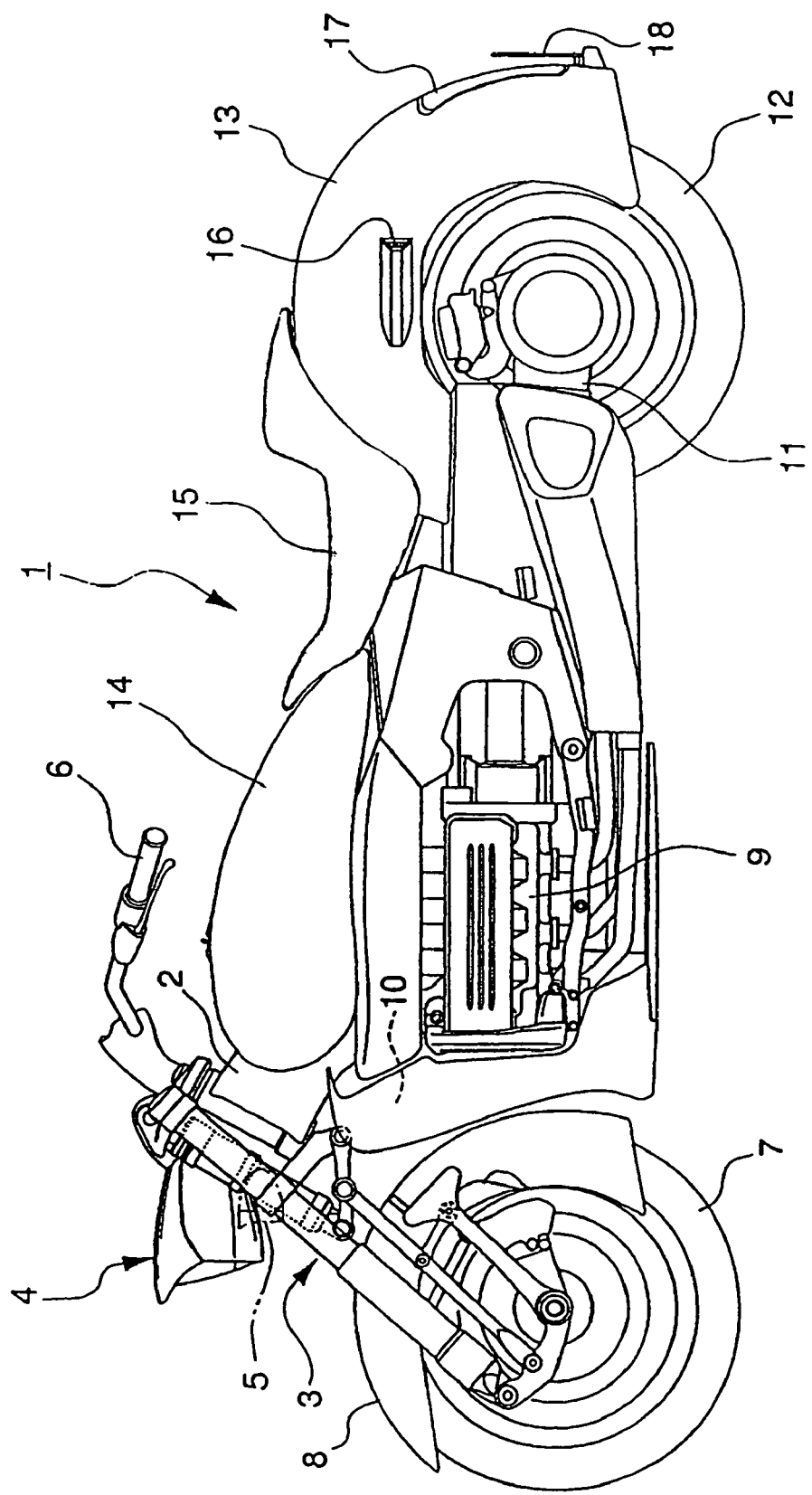
FIG. 1 is a side elevational view of a motorcycle according to an embodiment of the present invention.
Figure 2:
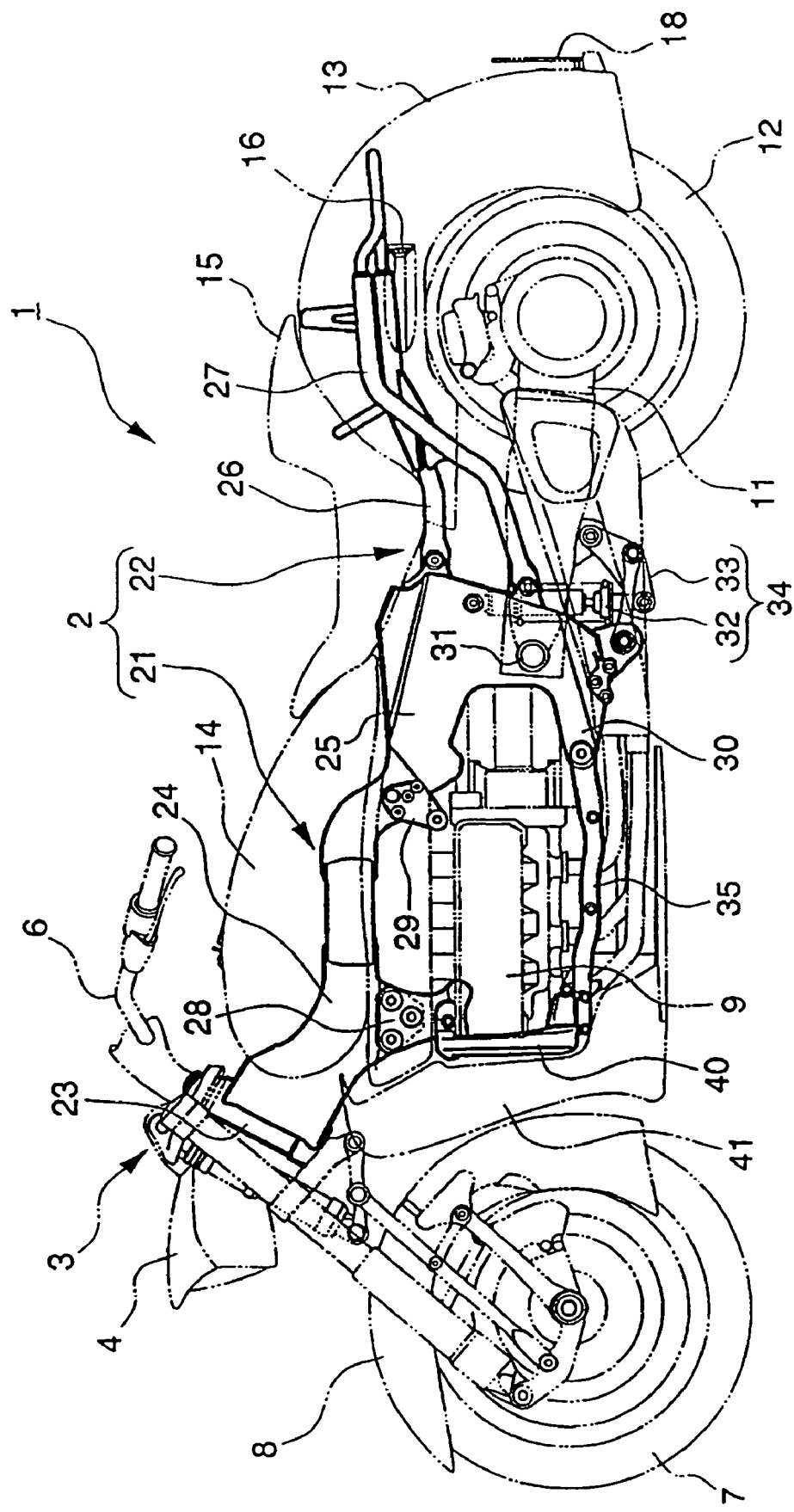
FIG. 2 is a side elevational view of a frame of the motorcycle according to the embodiment.

As shown in FIGS. 1 and 2, a motorcycle 1 is of the so-called American type, and has a vehicle frame 2, a linkage front suspension 3 angularly movably supported on a front end of the vehicle frame 2, a head light 4 mounted on an upper portion of the front suspension 3, a pair of left and right front blinkers 5 disposed below the head light 4, and a steering handle 6 mounted on an upper end of the front suspension 3 and disposed on an upper front portion of the vehicle body.

The motorcycle 1 also has a front wheel 7 rotatably supported on the front suspension 3, a front fender 8 supported on the front suspension 3 in covering relation to an upper side of the front wheel 7, an engine 9 supported on the vehicle frame 2, a radiator 10 disposed forwardly of the engine 9, a rear swing arm 11 mounted on a rear portion of the vehicle frame 2 for swinging movement about a lateral axis, a rear wheel 12 rotatably supported on a rear end of the rear swing arm 11 by a transmitting member and drivable by the engine 9, and a metal rear fender 13 supported on the vehicle frame 2 in covering relation to an upper side of the rear wheel 12.

The motorcycle 1 further includes a teardrop-shaped fuel tank 14 disposed on an upper portion of the vehicle frame 2, a main seat 15 disposed behind the fuel tank 14 for the driver to be seated thereon, a pair of left and right rear blinkers 16 mounted on a rear portion of the rear fender 13, tail lights 17, 17 disposed on both sides f the rear portion of the rear fender 13, the tail lights 17, 17 being the subject of the present invention, and a license plate 18 disposed on the lower end of a rear surface of the rear fender 13.

As shown in FIG. 2, the vehicle frame 2 comprises a front frame 21 and a rear frame 22 which are disposed respectively in front and rear regions.

The front frame 21 has a head pipe 23 on its front end, an upper frame 24 branched leftwardly and rightwardly from the head pipe 23 and extending obliquely downwardly and rearwardly and then substantially horizontally in the rearward direction, and a down frame 25 having a C-shaped member welded to a rear end of the upper frame 24 and extending slightly obliquely downwardly and rearwardly, then rearwardly substantially horizontally, and further downwardly, the channel-shaped member having a lower end extending forwardly.

The rear frame 22 has left and right upper pipes 26 connected to an upper rear end of the down frame 25, and left and right down pipes 27 connected to a vertically central rear end of the down frame 25 and extending substantially horizontally in the rearward direction.

The engine 9 is a horizontally opposed 6-cylinder engine having left and right banks of three cylinder heads and cylinders extending laterally outwardly in opposed relation to each other. The engine 9 is suspended by an engine hanger 28 formed on a lower portion of the upper frame 24, an engine hanger 29 formed on the lower surface of an upper portion of the down frame 25, and an engine hanger 30 formed on the front end of a lower portion of the down frame 25.

The rear swing arm 11 has a front end whose proximal portion is angularly movably supported by a pivot 31 of the down frame 25, so that the rear swing arm 11 is vertically swingable about the pivot 31. Between the rear swing arm 11 and the down frame 25, there is disposed a rear suspension device 34 comprising a cushion unit 32 and a link mechanism 33 for dampening and absorbing shocks which are applied to the rear wheel 12 from the road.

A side frame 35 which covers a side of the engine 9 in the longitudinal direction of the motorcycle is bolted to a region extending from the front end of a lower portion of the engine 9 to the front end of the lower portion of the down frame 25. The side frame 35 and an engine guard 40 disposed near a front portion of the engine 9 and spaced from the engine 9 protect the engine 9. 41 designates a radiator cover.

Figure 3:
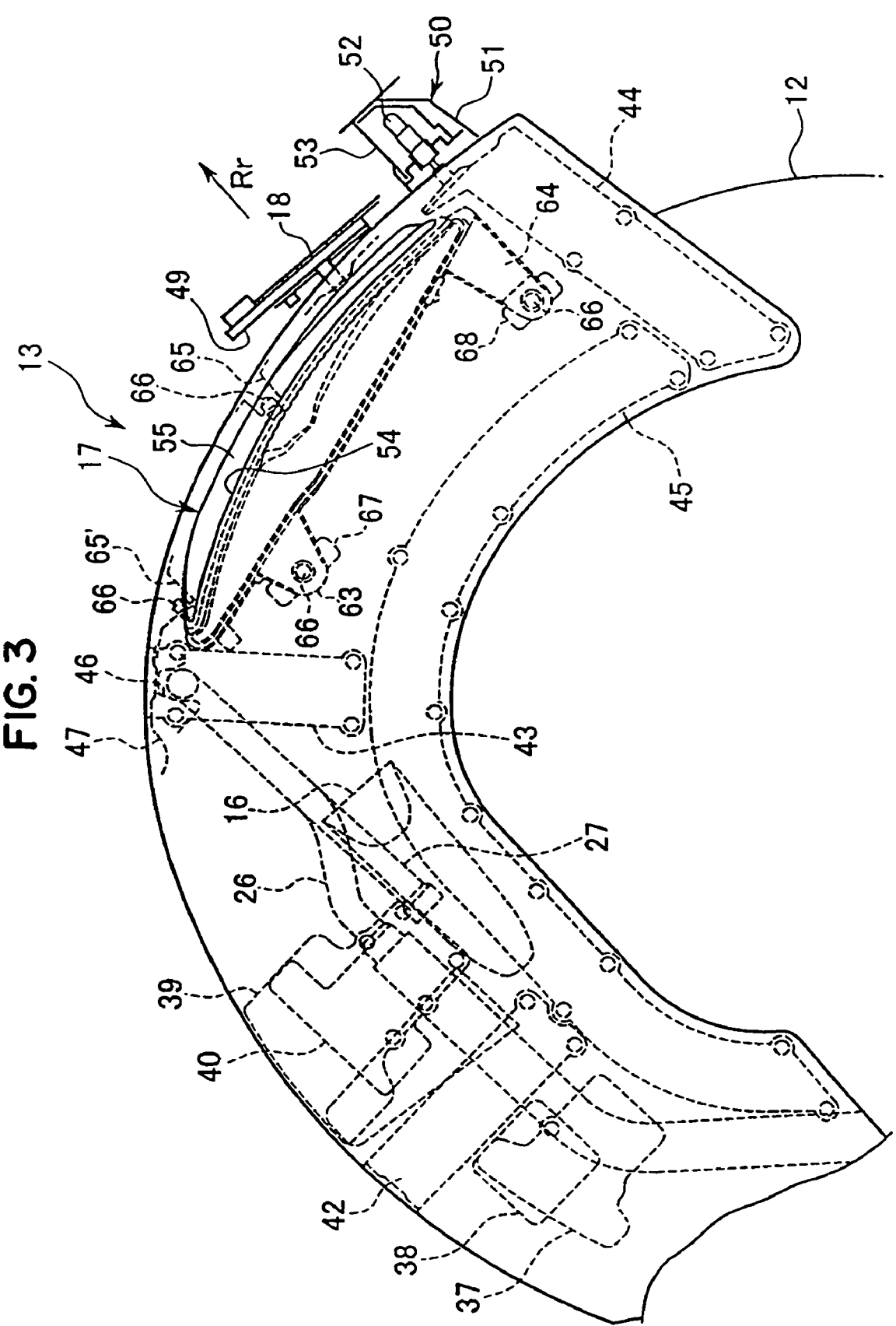
FIG. 3 is a side elevational view of a rear fender according to the embodiment.

As shown in FIG. 3, the rear fender 13 comprises a cross-sectionally C-shaped arcuate member and covers the upper side of the rear wheel 12. Backing members 42, 43, 44 are joined to front, central, and rear portions of the inner wall surface of the rear fender 13 along the inner circumferential surface thereof. Arcuate backing members 45 are joined to left and right inner wall surface of the rear fender 13. Rr indicates the rear side.

Brackets 37, 38, 39, 40 are mounted on the upper pipe 26 and the down pipe 27, and are joined to the inner wall surface of the rear fender 13, thus supporting the rear fender 13.

A holder 47 having a resilient retainer 46 which resiliently retains rear ends of the upper pipe 26 and the down pipe 27 on the inner circumferential surface of the rear fender 13 is mounted on the region where the central backing member 43 is disposed. The holder 47 provides supporting rigidity of a rear portion of the rear fender 13. A plate bracket 49 to which the license plate 18 is attached is mounted on a lower portion of the rear fender 13, and a license plate light 50 for illuminating the license plate 18 from below is mounted on the rear fender 13 below the plate bracket 49. The license plate light 50 has a bulb 52 disposed in a case 51 that is mounted on the lower end of the rear fender 13, and a clear lens 53 mounted on an upper surface thereof for passing light from the bulb 52 toward the license plate 18.

Figure 4:
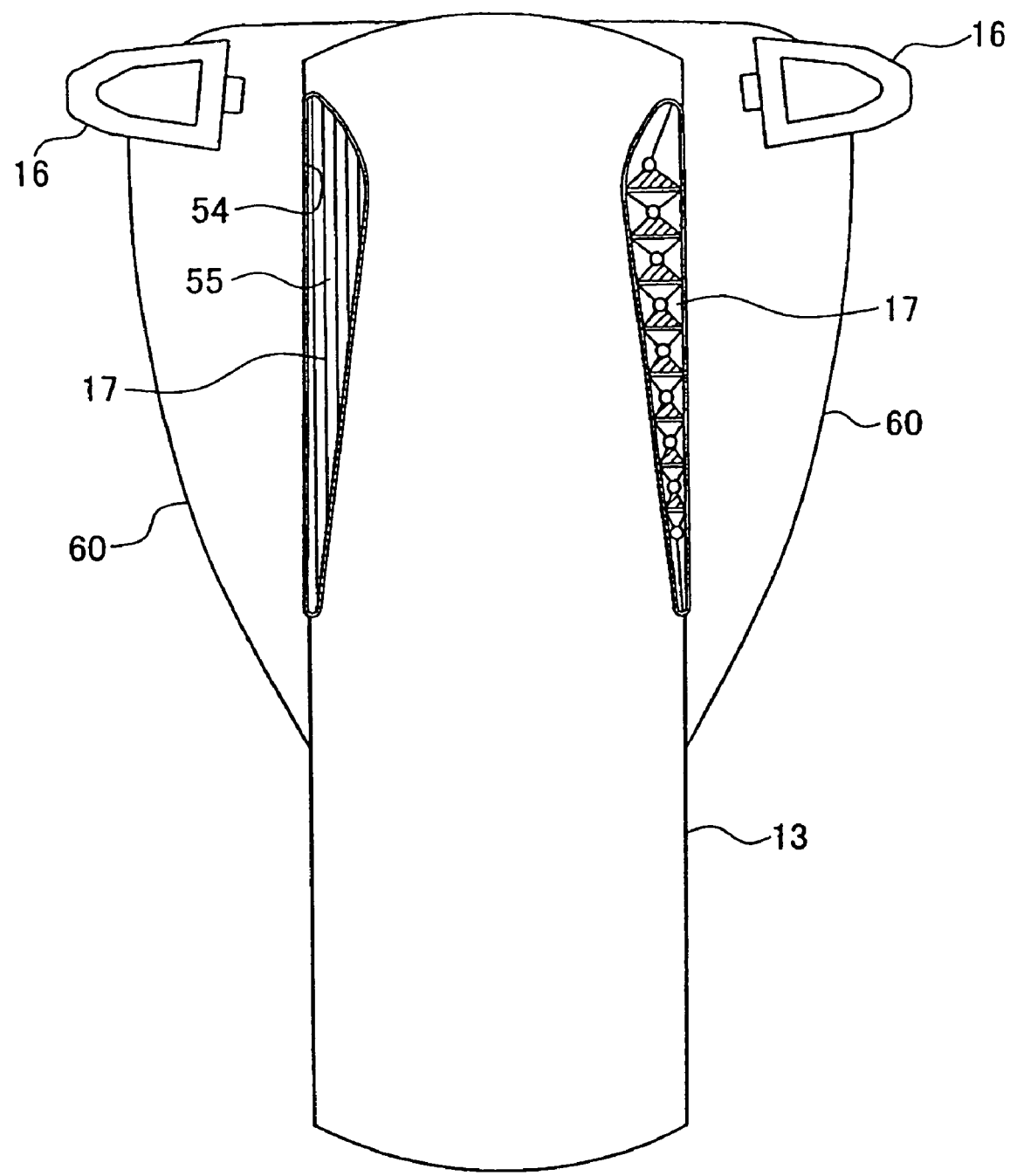
FIG. 4 is a rear view of the rear fender and associated parts according to the embodiment.

As shown in FIG. 4, the rear portion of the rear fender 13 has attachment holes 54 for the respective tail lights 17, 17 which are defined respectively in left and right sides of the outer circumferential surface of the rear portion of the rear fender 13 and extend vertically. The tail lights 17, 17 are mounted respectively in the attachment holes 54 and have lenses 55 providing outer surfaces thereof and having portions lying flush with the rear fender 13. In FIG. 4, the left tail light 17 is shown as having the lens 55 mounted in place, and the right tail light 17 is shown as having the lens 55 removed, for illustrative purposes. In FIG. 4, 60 represents side cowls.

Figure 5:
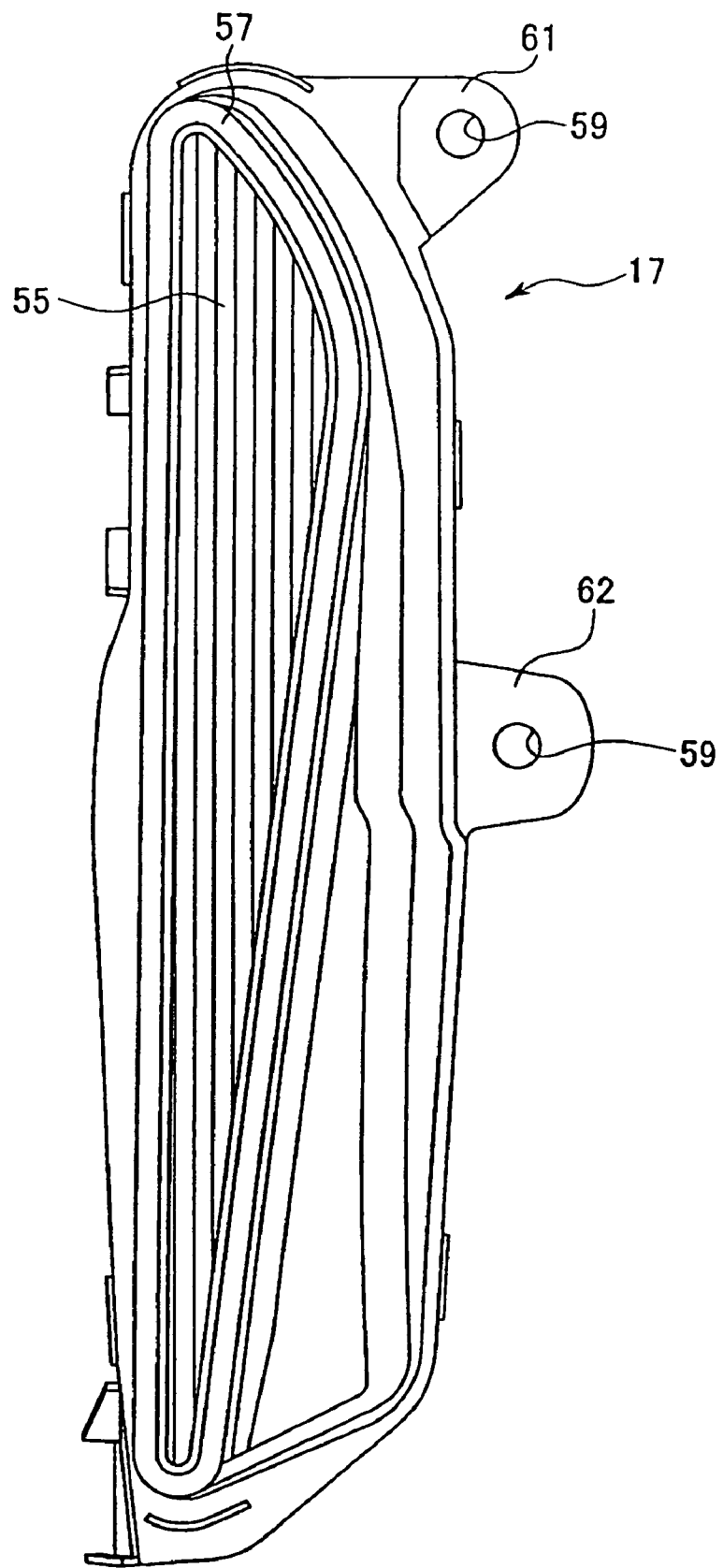
FIG. 5 is a front elevational view of a tail light according to the embodiment.
Figure 6:
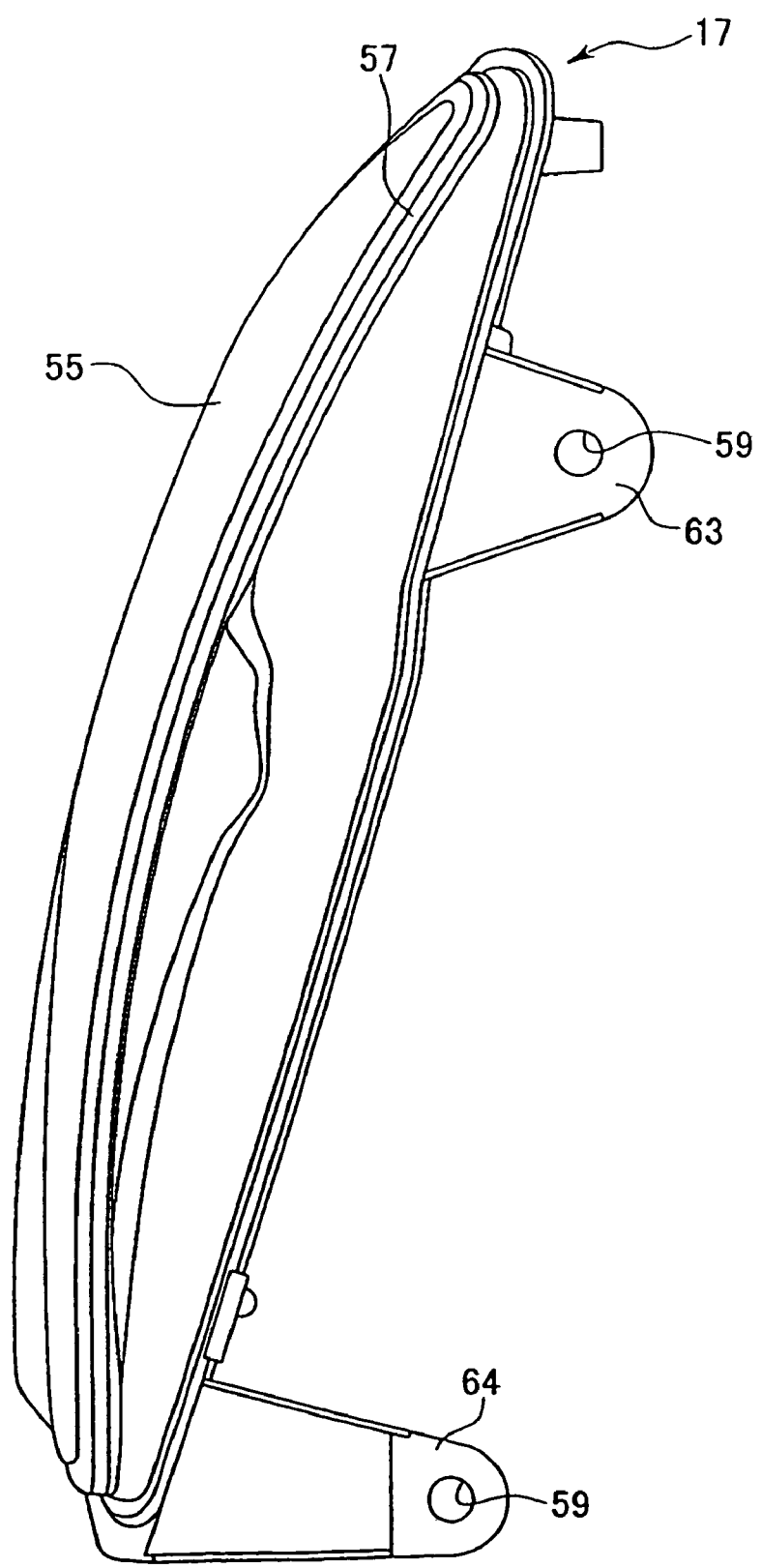
FIG. 6 is a side elevational view of the tail light according to the embodiment.
Figure 7:
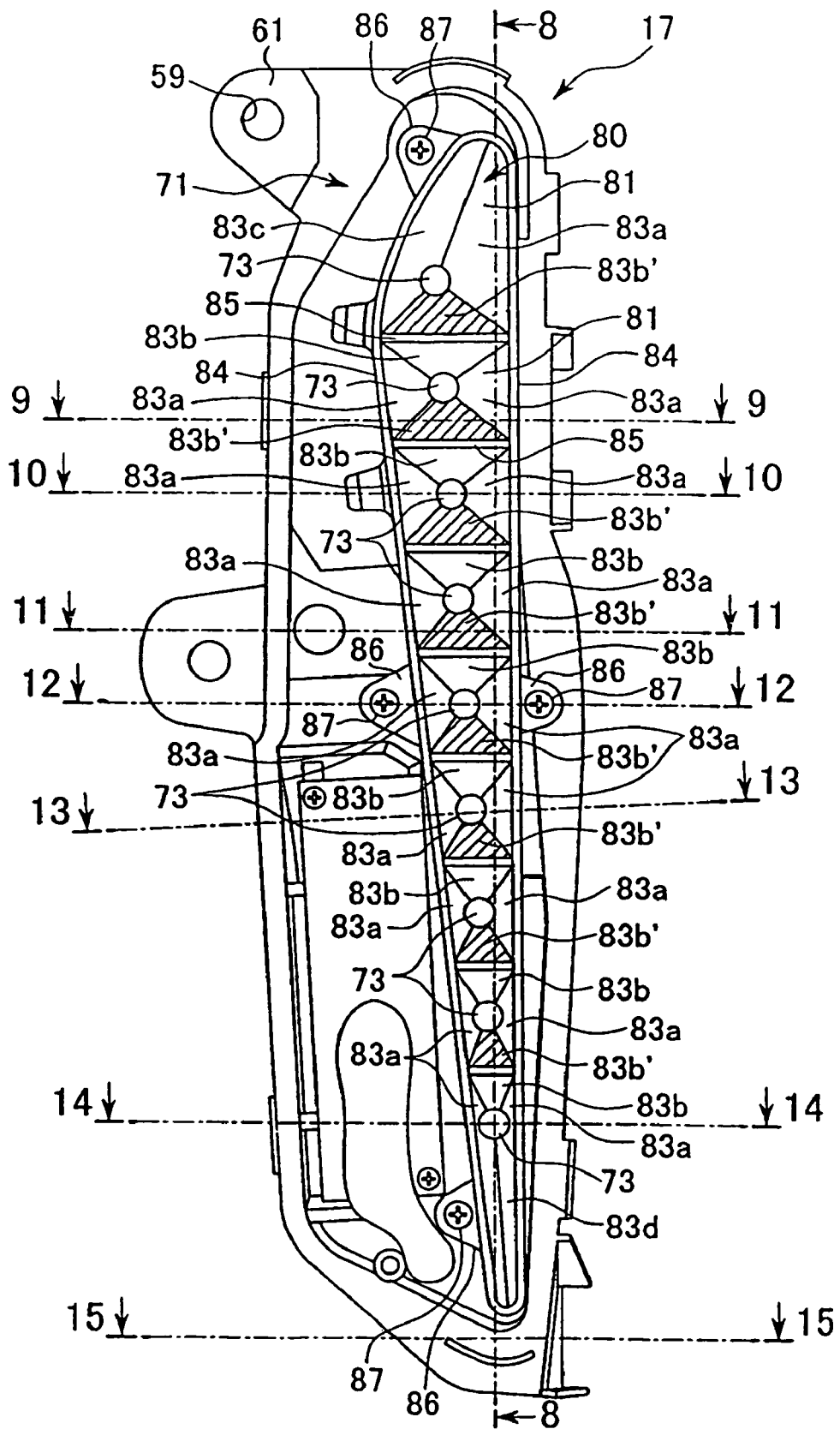
FIG. 7 is a front elevational view of the tail light, with a lens removed, according to the embodiment.

As shown in FIGS. 5 and 7, each of the tail lights 17 has an attachment bracket 61 projecting inwardly from an upper portion of an inner side edge thereof and an attachment bracket 62 projecting inwardly from a central portion thereof. As shown in FIG. 6, each of the tail lights 17 has an attachment bracket 63 disposed on an upper portion of an outer side edge thereof and an attachment bracket 64 disposed on a lower portion thereof. The attachment brackets 61 through 64 arc mounted on the rear fender 13. Numeral 59 represents attachment holes in the attachment brackets 61 through 64.

Figure 9:
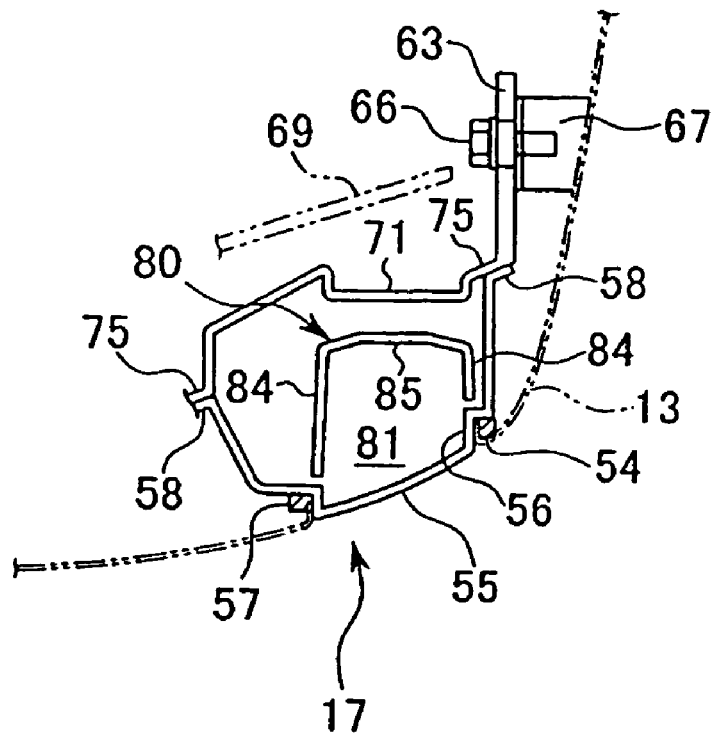
FIG. 9 is a cross-sectional view taken along line 9—9 of FIG. 7.
Figure 10:
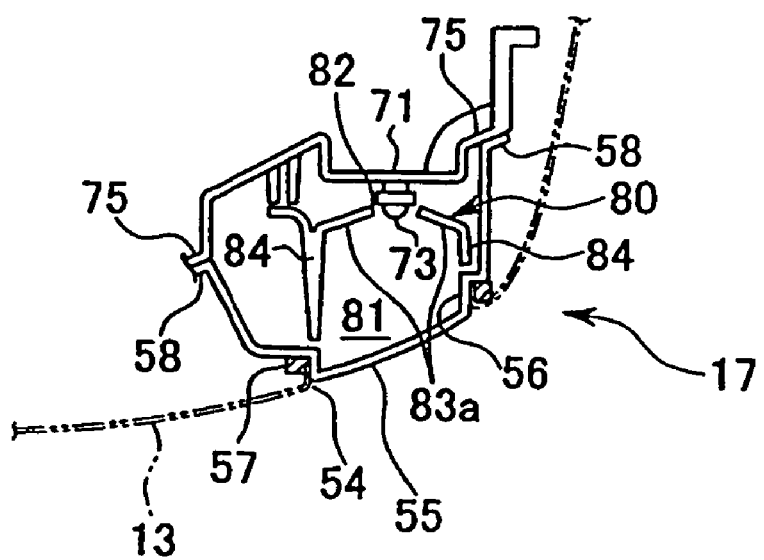
FIG. 10 is a cross-sectional view taken along line 10—10 of FIG. 7.
Figure 13:
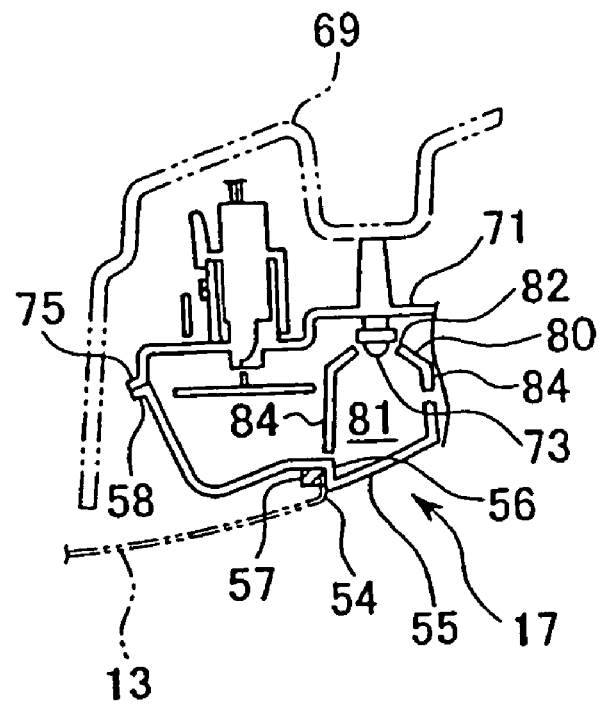
FIG. 13 is a cross-sectional view taken along line 13—13 of FIG. 7.
Figure 14:
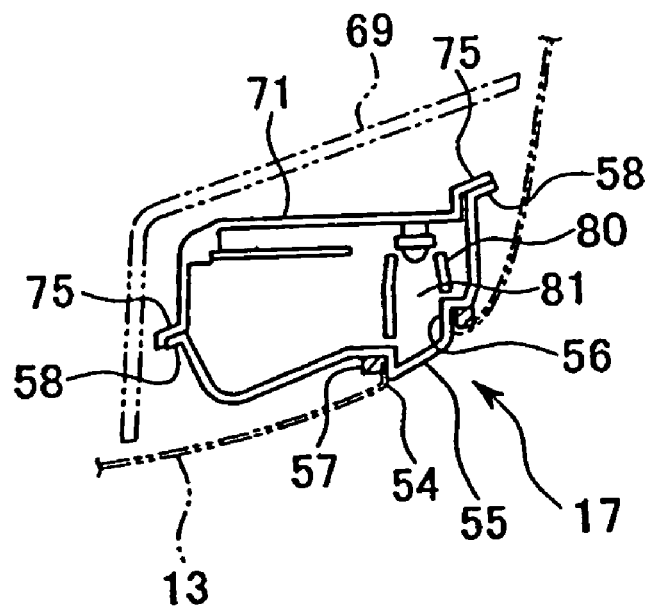
FIG. 14 is a cross-sectional view taken along line 14—14 of FIG. 7.
Figure 15:
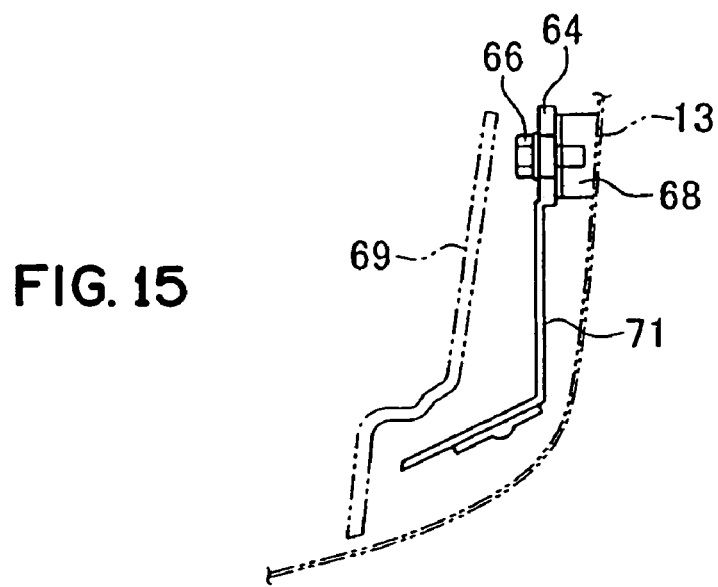
FIG. 15 is a cross-sectional view taken along line 15—15 of FIG. 7.

Specifically, as shown in FIGS. 3 and 11, the attachment bracket 62 on the central portion of the inner side edge of the tail light 17 is fastened by a bolt 66 to a fixture 65 disposed on the inner circumferential surface of the rear fender 13. As shown in FIG. 3, the attachment bracket 61 on the upper portion of the inner side edge of the tail light 17 is fastened by a bolt 66 to a fixture 65' on the rear fender 13. As shown in FIGS. 3 and 9, the attachment bracket 63 on the upper portion of the outer side edge of the tail light 17 is fastened by a bolt 66 to a fixture 67 on left and right inner wall surfaces of the rear fender 13. As shown in FIGS. 3 and 15, the attachment bracket 64 on the lower portion of the outer side edge of the tail light 17 is fastened by a bolt 66 to a fixture 68 on the left and right inner wall surfaces of the rear fender 13. In FIGS. 9 through 15, cross-sectional hatching is omitted from each illustration.

Figure 8:
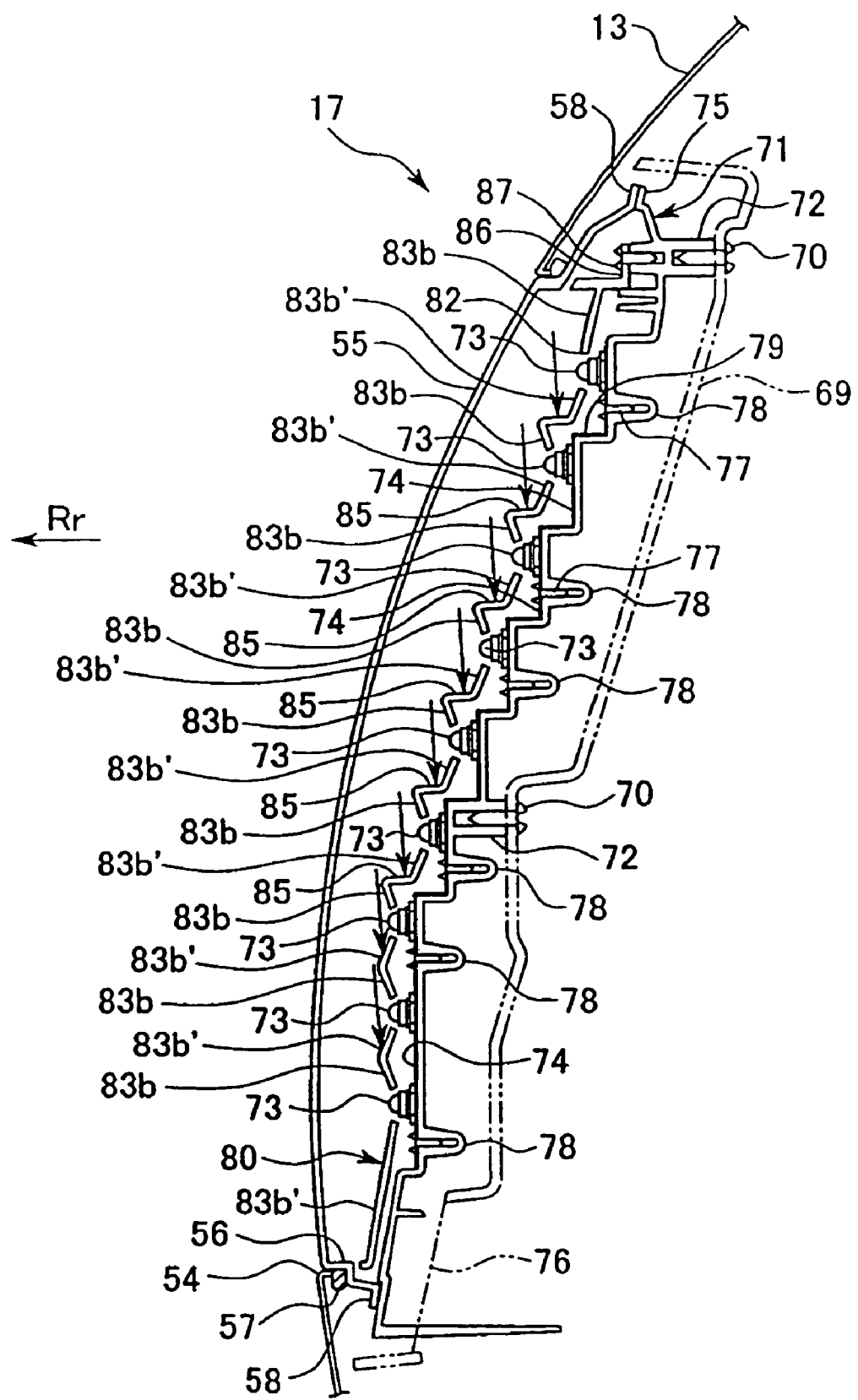
FIG. 8 is a cross-sectional view taken along line 8—8 of FIG. 7.

As shown in FIGS. 7 and 8, a protector 69 of synthetic resin supported on the rear fender 13 is disposed on the back of the rear fender 13. The tail light 17 has a base member 71 fixed by screws 70 to upper and intermediate portions of the protector 69. The base member 71 is made of synthetic resin and has attachment mounts 72, 72 at the position where the protector 69 is mounted, i.e., at the upper and intermediate portions thereof. The base member 71 is of a step-like structure which is progressively higher in the downward direction to displace rearwardly a plurality of flat facets 74

(only two reference numerals shown) as attachment surfaces for light-emitting bodies 73, to be described later, to match the downwardly curved configuration of the rear fender 13. The first three flat facets 74 from the lowermost one are not stepped, but are positioned in one plane.

Each of the flat facets 74 is oriented rearwardly. The base member 71 has an upper end positioned above the attachment mount 72 at the upper portion thereof, a flange 75 extending substantially fully in the circumferential direction, and a lower end bent forwardly and inserted in a lower opening 76 defined in the protector 69. Rr indicates the rear side.

A total of nine light-emitting bodies 73, which comprise light-emitting diodes and have a circular shape as viewed in plan, are mounted respectively on the flat facets 74 of the base member 71. The base member 71 is covered with a base metal layer 79 fixed in place by a plurality of screws 77 threaded into respective attachments 78. The light-emitting bodies 73 are fixedly mounted on the base metal layer 79. Therefore, the light-emitting bodies 73 on the flat facets 74 of the base member 71 which is of the step-like structure have their optical axes oriented rearwardly.

A reflector member (reflecting plate) 80 is disposed in covering relation to the base member 71 on which the light-emitting bodies 73 are mounted. The reflector member 80 is a synthetic resin having nine chambers 81 (only two reference numerals are shown for illustrative purposes) in a vertical succession. The reflector member 80 has holes 82 (only one reference numeral is shown for illustrative purposes) through which the upper ends of the light-emitting bodies 73 project, reflecting surfaces (second reflecting portions) 83b, reflecting surfaces (first reflecting portions) 83b', reflecting surfaces (second reflecting portions) 83a, and reflecting surfaces (second reflecting portions) 83a disposed upwardly, downwardly, leftwardly, and rightwardly of the holes 82. Each chamber 81 is defined by vertical walls 84 and horizontal walls 85.

Specifically, the reflecting surfaces 83a, 83a, which comprise triangular flat surfaces, are formed leftwardly and rightwardly of the holes 82 except for the uppermost and lowermost chambers 81, 81, the reflecting surfaces 83a, 83a extending obliquely rearwardly, and the reflecting surfaces 83b, 83b', which comprise triangular flat surfaces, are formed upwardly and downwardly of those holes 82, the reflecting surfaces 83b, 83b' being contiguous to the reflecting surfaces 83a.

The reflecting surfaces 83a, 83a, 83b, 83b' are shaped to provide the inner surfaces of a quadrangular pyramid. Light from the light-emitting body 73 disposed in each hole 82 that is positioned at the vertex of the quadrangular pyramid is reflected by the reflecting surfaces 83a, 83a, 83b, 83b' and radiated rearwardly. Since the base member 71 is stepped rearwardly in the downward direction thereof, the chambers 81 of the reflector member 80 are successively arranged downwardly obliquely in the rearward direction as a whole such that they are displaced rearwardly in the downward direction. Therefore, the light-emitting bodies 73 can be placed so as to extend as much as possible along the shape of the rear surface of the rear fender 13 which is arcuate downwardly from its upper portion, for thereby uniformizing the amount of light emitted from the tail light 17 in the vertical direction to make the tail light 17 better in appearance.

The reflecting surface 83b' is formed on the lower side of the uppermost chamber 81. The reflecting surface 83a is formed on the outer side of the uppermost chamber 81 (on the right side of the right tail light 17, or the left side of the left tail light 17). An integral reflecting surface (second reflecting surface) 83c is formed on the inner and upper sides of the uppermost chamber 81.

The reflecting surface 83b is formed on the upper side of the lowermost chamber 81. The reflecting surfaces 83a are formed on the left and right sides of the lowermost chamber 81. The reflecting surface 83d is formed on the lower side of the lowermost chamber 81. Because the reflecting surface 83d is directed substantially downwardly and scatters reflected sunlight, it does not have an anti-reflection layer as described below.

The reflecting surfaces (shown hatched) 83b' disposed downwardly of the respective light-emitting bodies 73 except for the lowermost one have a gray coating or a gray tape, for example, applied thereto for reducing external incident light from being reflected to make its reflectance lower than the reflectance of the other reflecting surfaces, i.e., the upper reflecting surface 83b and the left and right reflecting surfaces 83a, 83a. The reflecting surfaces, i.e., the upper reflecting surface 83b and the left and right reflecting surfaces 83a, 83a have a surface-treatment layer such as an evaporated aluminum layer or a plated chromium layer for increasing their reflectance. Alternatively, a glossy tape may be applied to those other reflecting surfaces. With this arrangement, the lower reflecting surfaces 83b' which tends to reflect sunlight that is applied at the greatest intensity from above in daytime is less liable to reflect sunlight rearwardly.

As shown in FIG. 7, the reflector member 80 has four mounting tabs 86, one on an upper portion of the inner side edge thereof, one on a lower portion of the inner side edge thereof, one on a vertically central portion of the inner side edge thereof, and one on a vertically central portion of the outer side edge thereof. The mounting tabs 86 are fastened to the base member 71 by screws 87.

Specifically, as shown in FIG. 8, the mounting tab 86 on the upper portion of the inner side edge is fastened to the attachment mount 72 of the protector 69, from its face side, by the screw 87. As shown in FIG. 12, the mounting tabs 86 on the vertically central portions of the inner and outer side edges thereof are fastened to attachment mounts 88 of the base member 71 by screws 87. Further, as shown in FIG. 7, the mourning tab 86 on the lower portion of the inner side edge of the reflector member 80 is fastened to the base member 71 by a screw 87.

The lens 55 is mounted in the attachment hole 54 of the rear fender 13 so as to lie flush with the surface of the rear fender 13, in covering relation to the outer side of the reflector member 80. The lens 55 has a step 56 in a region corresponding to the attachment hole 54, with a seal member 57 being disposed between the step 56 and the attachment hole 54 of the rear fender 13, as shown in FIGS. 9 through 14.

Since the tail lights 17, 17 and the outer surface of the rear fender 13 lie flush with each other, they are made more integral with each other, and are subject to less air resistance for reducing wind roar and air resistance at the time the motorcycle is running. Accordingly, the product quality is increased. Furthermore, when the motorcycle is running or cleaned, mud water or the like is prevented from flowing out of the gap between the step 56 and the attachment hole 54 and along the rear fender 13.

The step 56 of the lens 55 has an outer side edge extending linearly in the vertical direction and an upper side edge continuously extending downwardly slightly obliquely inwardly from the upper end of the outer side edge and having a lower end joined to the lower end of the outer side edge. Therefore, the region surrounded by the step 56 is of a vertically elongate narrow triangular shape as a whole. The reflector member 80 is also of a similar shape as viewed in plan complementarily to the region surrounded by the step 56 and the attachment hole 54.

As shown in FIGS. 8 through 14, the lens 55 has a flange 58 on its outer circumferential edge. The flange 58 is joined as by ultrasonic welding to the flange 75 of the base member 71 or a portion of the reflector member 80, forming a closed housing space for the light-emitting bodies 73 between the flange 58 and the flange 75 or the portion of the reflector member 80.

According to the above embodiment, when sunlight is applied to the lower reflecting surfaces 83b' of the reflecting surface 80 which receive a maximum amount of sunlight that is applied from above in daytime to the tail lights 17 on the rear fender 13 (as indicated by the solid-line arrows in FIG. 8), the gray coating or the gray tape applied to lower reflecting surfaces 83b' suppresses the reflection of sunlight, and the upper reflecting surfaces 83b and the left and right reflecting surfaces 83a, 83a reflect sufficient light from the light-emitting bodies 73. Therefore, the effect that the reflection of sunlight has on the reflected light from the light-emitting bodies 73 can be eliminated for increased visibility of the light-emitting bodies 73.

In particular, inasmuch as the tail light 17 is shaped to match the shape of the rear fender 13 as shown in FIG. 8, even though the reflector member 80 is mounted in a position that is disadvantageous in terms of sunlight with the lower reflecting surfaces 83b' being exposed to direct sunlight applied from above, the adverse effect that sunlight has is minimized. Consequently, visibility of the light-emitting bodies 73 is not impaired, and the rear fender 13 can be shaped with freedom.

In order to eliminate the effect that the reflection of sunlight applied from above has, it is only necessary to apply a coating or a tape to the lower reflecting surfaces 83b' of the reflector member 80. Unlike the attempts to place the tail lights 17 in a position where sunlight is hardly applied, limitations on the shaping of the vehicle body are not posed, the appearance of the vehicle body is not adversely affected, and the freedom of design is increased.

Particularly, if the coating is applied to prevent the reflection of sunlight, then since only the surfaces where much sunlight is applied may be coated, the tail lights can be manufactured simply by coating certain regions of general-purpose products, resulting in a reduction in the cost.

Since light-emitting diodes are used as the light-emitting bodies, the tail lights can suppress heating and can be of a low profile. Therefore, the tail lights can be designed with increased freedom, e.g., can be shaped and placed with increased freedom, for improved appearance. The tail lights according to the present invention can be used in a manner comparable to tail lights having ordinary bulbs which emit a lower amount of light.

Other embodiments of the present invention will be described with reference to FIGS. 16 and 17. According to the other embodiments, the tail light 17 is of a basic structure which is the same as with the previous embodiment, but resides in that the lower reflecting surfaces of the reflector member 80 have a structure for preventing and scattering the reflection of sunlight applied from above. Therefore, only the light-emitting body 73 of the reflector member 80 and the upper and lower reflecting surfaces will be illustrated and described. As with the previous embodiment, cross-sectional hatching is omitted from illustration.

Figure 16:
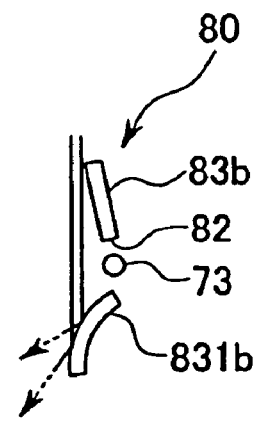
FIG. 16 is a fragmentary cross-sectional view of another embodiment of the present invention.

FIG. 16 shows an arrangement in which the upper reflecting surface (second reflecting portion) 83b of the reflector member 80 and the left and right reflecting surfaces (second reflecting portions), not shown, are in the form of triangular flat surfaces as with the previous embodiment, but a lower reflecting surface (first reflecting portion) 831b is formed as a convex surface. When sunlight is applied from above at the maximum intensity in daytime (as indicated by the solid-line arrow), the light is scattered and reflected by the convex surface of the lower reflecting surface 831b as indicated by the chain-line arrows. Consequently, light emitted from the light-emitting body 73 and reflected rearwardly from the upper reflecting surface 83b and the left and right reflecting surfaces is not mixed with the reflection of sunlight from the lower reflecting surface 831b, increasing visibility of the light-emitting body 73 from behind.

Figure 17:
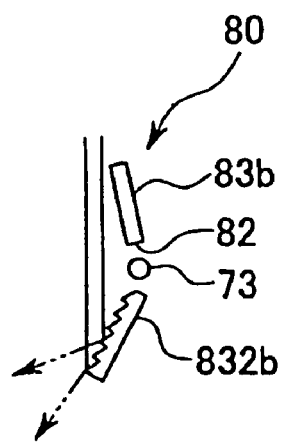
FIG. 17 is a fragmentary cross-sectional view of still another embodiment of the present invention.

FIG. 17 shows an arrangement in which the upper reflecting surface (second reflecting portion) 83b of the reflector member 80 and the left and right reflecting surfaces (second reflecting portions), not shown, are in the form of triangular flat surfaces as with the previous embodiment, but a lower reflecting surface (first reflecting portion) 832b is formed as a prism-cut surface. When sunlight is applied from above at the maximum intensity in daytime (as indicated by the solid-line arrow), the light is scattered and reflected by the prism-cut surface of the lower reflecting surface 832b as indicated by the chain-line arrows. Consequently, as with the above embodiment, light emitted from the light-emitting body 73 and reflected rearwardly from the upper reflecting surface 83b and the left and right reflecting surfaces is not mixed with the reflection of sunlight from the lower reflecting surface 832b, increasing visibility of the light-emitting body 73 from behind.

According to the above two embodiments, in addition to the advantages offered by the first embodiment, there is no need for any special members such as a coating or a tape used in the first embodiment for preventing the reflection of external light. Rather, the reflecting surface is only required to be formed as a convex surface or a prism-cut surface, without the need for any special subsequent processing, so that the tail light can be manufactured at a reduced cost.

The present invention is not limited to the above embodiments. Though the present invention has been described with respect to the tail lights 17 for motorcycles, it is also applicable to tail lights for motor vehicles. Furthermore, while light-emitting diodes have been described as an example of the light-emitting bodies 73, other light-emitting bodies may also be employed.

The number of light-emitting bodies used is given by way of example only, but should not be limited to any value. Though the invention has been described with respect to an example in which the four reflecting surfaces 83b, 83b', 83a, 83a are provided respectively in the upper, lower, left, and right sides, the number of reflecting surfaces is not limited to the illustrated number.

While the invention has been described in particular embodiments, it is to be understood that the words which have been used are words of description rather than limitation and that changes within the purview of the appended claims may be made without departing from the true scope and spirit of the invention in its broader aspects.

We claim:

1. A tail light structure of a motorcycle having a rear fender, comprising:

a first plurality of light-emitting diodes arranged on a left side of the rear fender and a second plurality of light-emitting diodes arranged on a right side of the rear fender, the first and second plurality of light-emitting diodes extend generally vertically on the rear fender;

each of the first and second plurality of light-emitting diodes are mounted on a base member having a step-like structure extending rearwardly and that is progressively higher in a downward direction; and a reflecting plate associated with each of the first and second plurality of light-emitting diodes, each reflecting plate having openings through which ends of the respective first and second plurality of light-emitting diodes project, each reflecting plate for reflecting light from the light-emitting diodes for external illumination, wherein each said reflecting plate has a plurality of first reflecting portions for receiving maximum external light and a plurality of second reflecting portions other than the first reflecting portions, each first reflecting portion is disposed below a respective one of the second reflecting portions, said second reflecting portions being flat, and said first reflecting portions having a lower reflectance than said second reflecting portions.

2. A tail light structure according to claim 1, wherein each said first reflecting portion has a coating for reducing external incident light from being reflected.

3. A tail light structure according to claim 1, wherein each said first reflecting portion has a structure for reducing external incident light from being reflected.

4. A tail light structure according to claim 3 wherein the structure of each said first reflecting portion has a convex reflecting surface to scatter external incident light.

5. A tail light structure according to claim 3 wherein each said first reflecting portion has a prism-cut reflecting surface to scatter external incident light.

6. A tail light structure according to claim 1, wherein each reflecting plate includes third and fourth reflecting portions, wherein the first, second, third and fourth reflecting portions surround the light-emitting bodies, with each first reflecting portion beneath the respective light-emitting body and each of the second, third and fourth reflecting portions to the sides and above the respective light-emitting body.

7. A tail light structure according to claim 6, wherein the first, second, third and fourth reflecting portions are triangular, and the light-emitting bodies are disposed at a vertex of the respective first, second, third and fourth reflecting portions.

* * * * *